United States Patent
Raskin et al.

(10) Patent No.: US 11,210,432 B2
(45) Date of Patent: Dec. 28, 2021

(54) METHOD AND APPARATUS FOR SELECTIVELY SNOOPING AND CAPTURING DATA FOR SECURE COMPUTER INTERFACES

(71) Applicant: JANUS TECHNOLOGIES, INC., Half Moon Bay, CA (US)

(72) Inventors: Sofin Raskin, Los Altos, CA (US); Joshua Porten, Austain, TX (US); Michael Wang, Taipei (TW); Kuen Yu Lai, San Jose, CA (US)

(73) Assignee: Janus Technologies, Inc., Half Moon Bay, CA (US)

( * ) Notice: Subject to any disclaimer, the term of this patent is extended or adjusted under 35 U.S.C. 154(b) by 150 days.

(21) Appl. No.: 13/971,604

(22) Filed: Aug. 20, 2013

(65) Prior Publication Data
US 2015/0058975 A1    Feb. 26, 2015

(51) Int. Cl.
*G06F 11/00*    (2006.01)
*G06F 12/14*    (2006.01)
(Continued)

(52) U.S. Cl.
CPC ................... *G06F 21/85* (2013.01)

(58) Field of Classification Search
CPC ..... H04L 63/1416; G06F 21/50; G06F 21/85; G06F 21/82–85; G06F 21/70; G06F 21/78
(Continued)

(56) References Cited

U.S. PATENT DOCUMENTS 4,598,170 A    7/1986    Piosenka et al.
5,191,542 A    3/1993    Murofushi
(Continued)

FOREIGN PATENT DOCUMENTS

EP    2517144    7/2011
EP    2407905    1/2012
(Continued)

OTHER PUBLICATIONS

Garfinkel, "Terra: A Virtual Machine-Based Platform for Trusted Computing", ACM SOSP. Proc. Of the ACM Symp. On Operating system Printciples, Oct. 22, 2003, pp. 193-206
(Continued)

*Primary Examiner* — Amie C. Lin
(74) *Attorney, Agent, or Firm* — Foley & Lardner LLP (57) ABSTRACT

The present invention relates to methods and apparatuses for securing otherwise unsecured computer communications that addresses the above shortcomings among others. According to certain aspects, the invention relates to methods and apparatuses for implementing device snooping, in which some or all traffic passing between a host and a connected device is captured into memory and analyzed in real time by system software. According to other aspects, the invention relates to real time capture of certain types of traffic and communication of the captured traffic to a remote management system. According to still further aspects, the invention relates to detecting security threats in real time. Upon threat detection, possible actions are blocking individual devices or alerting a system administrator. According to certain additional aspects, the security functions performed by methods and apparatuses according to the invention can be logically transparent to the upstream host and to the downstream device.

26 Claims, 7 Drawing Sheets

(51) Int. Cl.
*G06F 12/16* (2006.01)
*G08B 23/00* (2006.01)
*G06F 21/85* (2013.01)

(58) Field of Classification Search
USPC .......................................................... 726/22
See application file for complete search history.

(56) References Cited

U.S. PATENT DOCUMENTS

| | | | |
|---|---|---|---|
| 5,724,027 A | 3/1998 | Shipman et al. | |
| 5,946,469 A | 8/1999 | Chidester | |
| 6,061,794 A | 5/2000 | Angelo et al. | |
| 6,088,802 A | 7/2000 | Bialick et al. | |
| 6,457,164 B1 | 9/2002 | Hwang et al. | |
| 6,467,052 B1 * | 10/2002 | Kaler | G06F 11/302 |
| | | | 714/39 |
| 6,507,586 B1 * | 1/2003 | Satran | H04H 20/95 |
| | | | 370/432 |
| 6,507,914 B1 | 1/2003 | Cain et al. | |
| 6,546,491 B1 | 4/2003 | Challener et al. | |
| 6,594,780 B1 | 7/2003 | Shen et al. | |
| 6,725,438 B2 | 4/2004 | Van Ginneken | |
| 6,782,424 B2 | 8/2004 | Yodaiken | |
| 6,820,160 B1 | 11/2004 | Allman | |
| 6,922,817 B2 | 7/2005 | Bradfield et al. | |
| 7,120,892 B1 | 10/2006 | Khol et al. | |
| 7,149,992 B2 | 12/2006 | Chang et al. | |
| 7,240,303 B1 | 7/2007 | Schubert | |
| 7,287,107 B2 | 10/2007 | Noonan et al. | |
| 7,320,071 B1 | 1/2008 | Friedman et al. | |
| 7,330,891 B2 | 2/2008 | Yodaiken | |
| 7,337,100 B1 | 2/2008 | Hutton et al. | |
| 7,340,700 B2 | 3/2008 | Emerson | |
| 7,350,204 B2 | 3/2008 | Lambert et al. | |
| 7,396,257 B2 | 7/2008 | Takahashi | |
| 7,467,408 B1 * | 12/2008 | O'Toole, Jr. | H04L 63/145 |
| | | | 726/13 |
| 7,469,343 B2 | 12/2008 | Ray | |
| 7,478,235 B2 | 1/2009 | England et al. | |
| 7,516,217 B2 | 4/2009 | Yodaiken | |
| 7,518,614 B2 | 4/2009 | Emerson et al. | |
| 7,635,272 B2 | 12/2009 | Poppe | |
| 7,636,653 B1 * | 12/2009 | Chan | G06F 17/5027 |
| | | | 703/14 |
| 7,677,065 B1 | 3/2010 | Miao | |
| 7,962,755 B2 | 6/2011 | Pizano et al. | |
| 7,987,497 B1 | 7/2011 | Giles et al. | |
| 8,135,881 B1 * | 3/2012 | Obkircher | G06F 13/4291 |
| | | | 710/37 |
| 8,402,529 B1 | 3/2013 | Green et al. | |
| 8,429,419 B2 | 4/2013 | Endrys | |
| 8,566,934 B2 | 10/2013 | Srivastava | |
| 8,606,971 B2 | 12/2013 | Cain et al. | |
| 8,627,106 B2 | 1/2014 | Pizano et al. | |
| 9,331,915 B1 * | 5/2016 | Brandwine | H04L 43/04 |
| 2002/0007456 A1 | 1/2002 | Peinado et al. | |
| 2002/0069396 A1 | 6/2002 | Bhattacharya et al. | |
| 2003/0131119 A1 | 7/2003 | Noonan et al. | |
| 2004/0199879 A1 | 10/2004 | Bradfield | |
| 2004/0268147 A1 * | 12/2004 | Wiederin | G06F 21/567 |
| | | | 726/12 |
| 2005/0240892 A1 | 10/2005 | Broberg et al. | |
| 2006/0039468 A1 | 2/2006 | Emerson et al. | |
| 2006/0116777 A1 * | 6/2006 | Dax | G05B 19/056 |
| | | | 700/18 |
| 2007/0255963 A1 | 11/2007 | Pizano et al. | |
| 2008/0091833 A1 | 4/2008 | Pizano et al. | |
| 2008/0091943 A1 * | 4/2008 | Wu | G06F 21/85 |
| | | | 713/165 |
| 2008/0247540 A1 | 10/2008 | Ahn et al. | |
| 2008/0263658 A1 | 10/2008 | Michael et al. | |
| 2008/0276302 A1 | 11/2008 | Touboul | |
| 2009/0013111 A1 | 1/2009 | Berland et al. | |
| 2009/0033668 A1 | 2/2009 | Pederson et al. | |
| 2009/0212844 A1 | 8/2009 | Darmawan et al. | |
| 2009/0319782 A1 | 12/2009 | Lee | |
| 2010/0024004 A1 | 1/2010 | Boegelund et al. | |
| 2010/0192230 A1 | 7/2010 | Steeves et al. | |
| 2010/0201400 A1 | 8/2010 | Nardone et al. | |
| 2010/0214926 A1 * | 8/2010 | Khan | H04L 43/028 |
| | | | 370/236 |
| 2011/0088093 A1 * | 4/2011 | Kang | G06F 21/567 |
| | | | 726/22 |
| 2011/0102443 A1 | 5/2011 | Dror et al. | |
| 2011/0131423 A1 | 6/2011 | Ponsini | |
| 2011/0258460 A1 | 10/2011 | Pizano et al. | |
| 2012/0017197 A1 | 1/2012 | Mehta et al. | |
| 2012/0192129 A1 | 7/2012 | Bowers | |
| 2012/0324067 A1 | 12/2012 | Hari et al. | |
| 2013/0067534 A1 | 3/2013 | Softer | |
| 2013/0160122 A1 * | 6/2013 | Choi | H04L 63/1458 |
| | | | 726/23 |
| 2013/0174256 A1 * | 7/2013 | Powers | H04L 63/1416 |
| | | | 726/23 |
| 2013/0212671 A1 | 8/2013 | Wang et al. | |
| 2013/0238908 A1 | 9/2013 | Pizano | |
| 2013/0254838 A1 * | 9/2013 | Ahuja et al. | 726/1 |
| 2014/0195217 A1 * | 7/2014 | Myrick | G06F 17/5009 |
| | | | 703/21 |
| 2014/0355613 A1 * | 12/2014 | Pope | H04L 49/20 |
| | | | 370/392 |

FOREIGN PATENT DOCUMENTS

| | | |
|---|---|---|
| TW | 200537311 A | 11/2005 |
| TW | I325113 B | 5/2010 |

OTHER PUBLICATIONS

Landau, et al., "SlitX: S;lit Guest/Hypervisor Execution on Multi-Core", 3rd Workshop of IO irtualization, Jun. 14, 2011, pp. 1-7.

International Search Report and Written Opinion dated Nov. 24, 2014 in corresponding PCT/US2014/051679.

International Preliminary Report on Patentability for International Patent Application No. PCT/US2014/051679, dated Mar. 3, 2016, 9 pages.

* cited by examiner

METHOD AND APPARATUS FOR SELECTIVELY SNOOPING AND CAPTURING DATA FOR SECURE COMPUTER INTERFACES

FIELD OF THE INVENTION

A system and method for securing computer systems with otherwise non-secure computer interfaces. Particular embodiments of the invention include methods and apparatuses for capturing, processing, delivering, and analyzing traffic on one or more computer interfaces based on security policies.

BACKGROUND OF THE INVENTION

Conventional computing devices typically include one to many conventional types of input/output (I/O) ports for communicating with connectable external devices such as mice, keyboards, wireless modems, etc. Such computing devices further include one or more internal connections between a host processor (e.g. CPU) with internal devices such as storage devices (e.g. SATA/SAS drives). In conventional devices, these internal and external communications are rarely secured.

With respect to I/O ports, for example, Universal Serial Bus (USB) is a standard communication protocol between a host computer and peripheral devices. However, USB does not provide any level of security for the data transmitted from the peripheral devices to the host system. This poses a huge risk for enterprises, and more particularly, IT administrators who are responsible for securing their IT systems and devices.

USB is inherently not secure for several reasons. One reason is that USB data is sent in plain text. The data can be captured and analyzed by any USB protocol analyzer or software application. Another reason is that any USB peripheral is capable of connecting to a host computer since USB specification doesn't provide any means to filter unwanted or potentially harmful devices.

Relatedly, security can be compromised in various ways by the communication of various types of data. In organizations and/or environments where the security for many different computer systems need to managed, mechanisms are needed to deal with certain types of data and communications in an efficient but fast way.

SUMMARY OF THE INVENTION

The present invention relates to methods and apparatuses for securing otherwise unsecured computer communications that addresses the above shortcomings among others. According to certain aspects, the invention relates to methods and apparatuses for implementing device snooping, in which some or all traffic passing between a host and a connected device is captured into memory and analyzed in real time by system software. According to other aspects, the invention relates to real time capture of certain types of traffic and communication of the captured traffic to a remote management system. According to still further aspects, the invention relates to detecting security threats in real time. Upon threat detection, possible actions are blocking individual devices or alerting a system administrator. According to certain additional aspects, the security functions performed by methods and apparatuses according to the invention can be logically transparent to the upstream host and to the downstream device.

In accordance with these and other aspects, a computer system according to embodiments of the invention includes an interface for sending and receiving data, a host that executes an operating system and applications that generate and utilize the data sent and received via the interface, and a secure subsystem interposed between the host and the interface for transparently capturing certain of the data sent and received via the interface.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable device snooping, in which some or all traffic passing between a host and a connected device is captured into memory, stored and/or analyzed in real time by local or remote system software.

Figure 1:
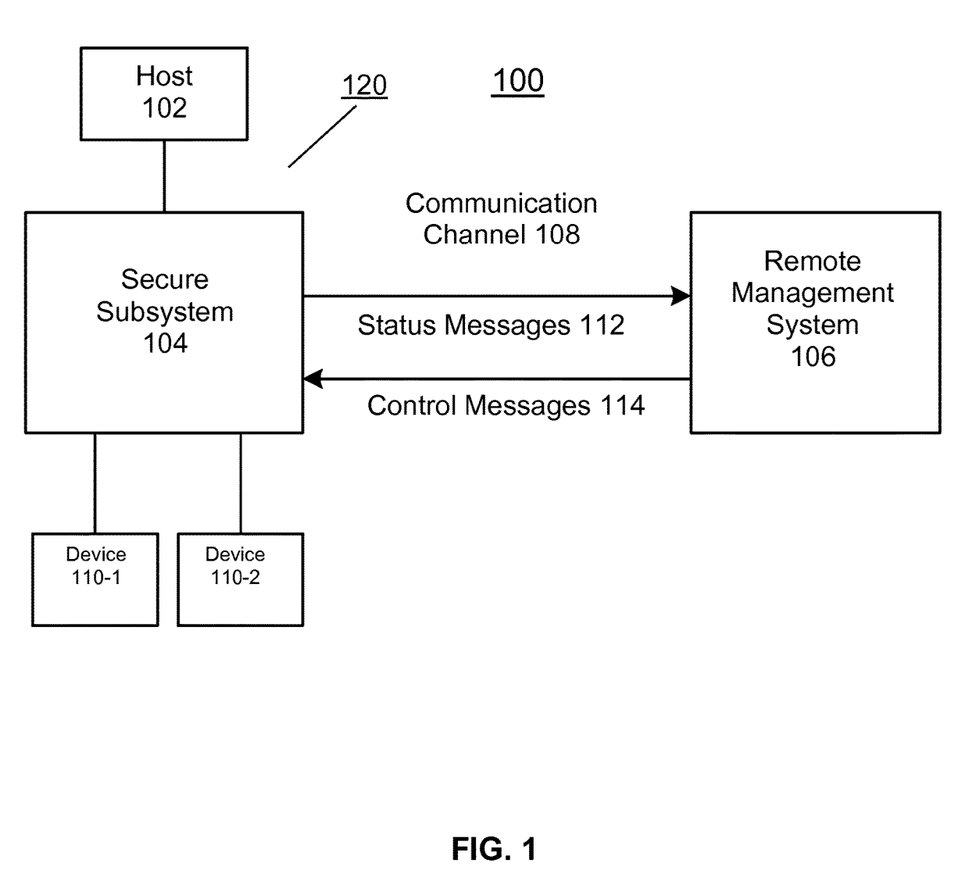
FIG. 1 is a block diagram illustrating an example system for securing otherwise unsecure interface communications according to embodiments of the invention.

FIG. 1 is a system level block diagram of a management system 100 according to embodiments of the invention. As shown, system 100 includes a managed secure computer 120 comprising a Host 102, Secure Subsystem 104, and two directly attached (internally or externally) devices 110-1 and 110-2.

There are many possible configurations of system 100, host 102, subsystem 104 and attached devices 106 that all fall within the scope of the invention, and the present invention is not limited to any particular configuration. In one non-limiting example configuration, secure computer 120 is a standalone computer system, similar to a conventional desktop, laptop or pad computer. In such an example, host 102 is implemented by a CPU (e.g. x86), a conventional operating system such as Windows and associated device driver software, as well as I/O interfaces such as SATA hosts and USB hosts. In accordance with certain aspects of the invention, in this example, the operation and functionality of subsystem 104 is completely transparent to the host 102 and associated operating system and application software. Moreover, the operating experience of secure computer 120 by a user is identical to the experience of a conventional desktop, laptop or pad computer, apart from the security functionality of the present invention. So while the application software that can run on the computer is virtually unrestricted, use of devices 110 is strictly controlled by subsystem 106 which enforces security policies as will be described in more detail below.

In these and other embodiments, subsystem 104 is preferably an embedded system. As such, it runs a designated software system furnished together with an embedded processor, and can not be modified by the end-user of the computer under any circumstances. According to aspects of the present invention, subsystem 104 performs one or more of the following functions: capturing of traffic between host 102 and device(s) 110 (traffic can be USB, SAS, SATA, Ethernet, Firewire (IEEE 1394), Thunderbolt, etc.); pre-processing of traffic; buffering of traffic for later analysis and/or capture; delivering traffic to the remote management system 106; and monitoring of traffic to detect security threats in real time. Upon threat detection, possible actions can include blocking individual devices or alerting system administrator. In embodiments, the particular functions performed by subsystem can be configured based on security policies set by remote management system 106.

An example architecture for implementing subsystem 104 together with host 102 is described in co-pending application Ser. No. 13/971,732, the contents of which are incorporated by reference herein. Those skilled in the art will understand how to implement the principles of the present invention in various configurations of secure computer 120 after being taught by the present disclosure.

Devices 110 can include peripheral devices such as keyboards, mice, touchpads, touchscreens, displays, monitors, printers, etc. Devices 110 can also include internal and external storage devices such as disk drives, thumb drives, memory cards, etc. Devices 106 can also include network access interfaces such as Ethernet, Firewire, etc. as well as other communication interfaces such as WiFi, Bluetooth, 3G or 4G-LTE, etc.

In general, the types of communications used by devices 110 and monitored by the present inventions are point to point. The differences between them are at the protocol level, and generally transparent to the security features performed by the present invention (with some exceptions).

Various aspects of secure computer 120 that can be adapted for use in, or practiced together with, the present invention are described in more detail in co-pending application Ser. No. 13/971,582, the contents of which are incorporated herein by reference in their entirety.

FIG. 1 further shows a Remote Management system 106 coupled to secure subsystem 104 of secure computer 120 by a communication channel 108. FIG. 1 also shows the different message types that can be sent over a Communication Channel 108, specifically status messages 112 from secure subsystem 104 to remote management system 106, control messages 114 from remote management system 106 to secure subsystem 104, and data messages 116 from secure subsystem 104 to remote management system 106.

Although FIG. 1 shows remote management system 106 coupled to only one secure subsystem 104, it should be apparent that one or more additional secure subsystems 104 may be similarly coupled to remote management system 106.

Channel 108 can be implemented in various ways, possibly depending on the number and type of devices to be managed by system 106. Channel 108 can be a separate direct point-to-point link between system 106 and subsystem 104. In other embodiments, channel 108 can be implemented by a transmission medium that is shared between many subsystems 104. In these and other embodiments, the medium can be any combination of wired or wireless media, such as Ethernet or Wireless LAN. In these and other embodiments, channel 108 can be implemented by various types and/or combinations of public and private networks using proprietary protocols or conventional protocols such as UDP or TCP. In embodiments, data sent over communication channel 108 is encrypted, for example using secure VPN, to improve security.

According to general aspects, in embodiments of the invention, remote management system 106 is responsible for saving traffic captured from one or more subsystems 104 and analyzing the traffic. In embodiments, traffic from multiple subsystems 104 is saved into a database-like structure that facilitates fast (near real-time) search for interesting events such as security threat signatures. For example, system 106 can analyze suspicious activity from multiple computers 120, cross-correlating snooping data from various PCs and looking for irregular or suspicious data and usage patterns. A more thorough forensic analysis can be also performed at slower speed. Background tagging and indexing of this database can be optionally implemented.

Control messages 114 sent from Remote Management System 106 to one or more Secure I/O Subsystems 104 contain different configuration commands and settings to be described in more detail below. Status messages 112 sent from one or more Secure I/O Subsystem 104 to Remote Management System 106 contain different notifications and alerts. Example of status messages 112 include alerts of security threats detected by Secure I/O subsystem 104 based on data communicated between host 102 and devices 110 and snooped by secure I/O subsystem 104. Data messages 116 from Secure I/O Subsystem 104 to Remote Management System 106 include (optionally) filtered and compressed data that has been captured from communications between host 102 and devices 110 by Secure I/O Subsystem 104.

Figure 2:
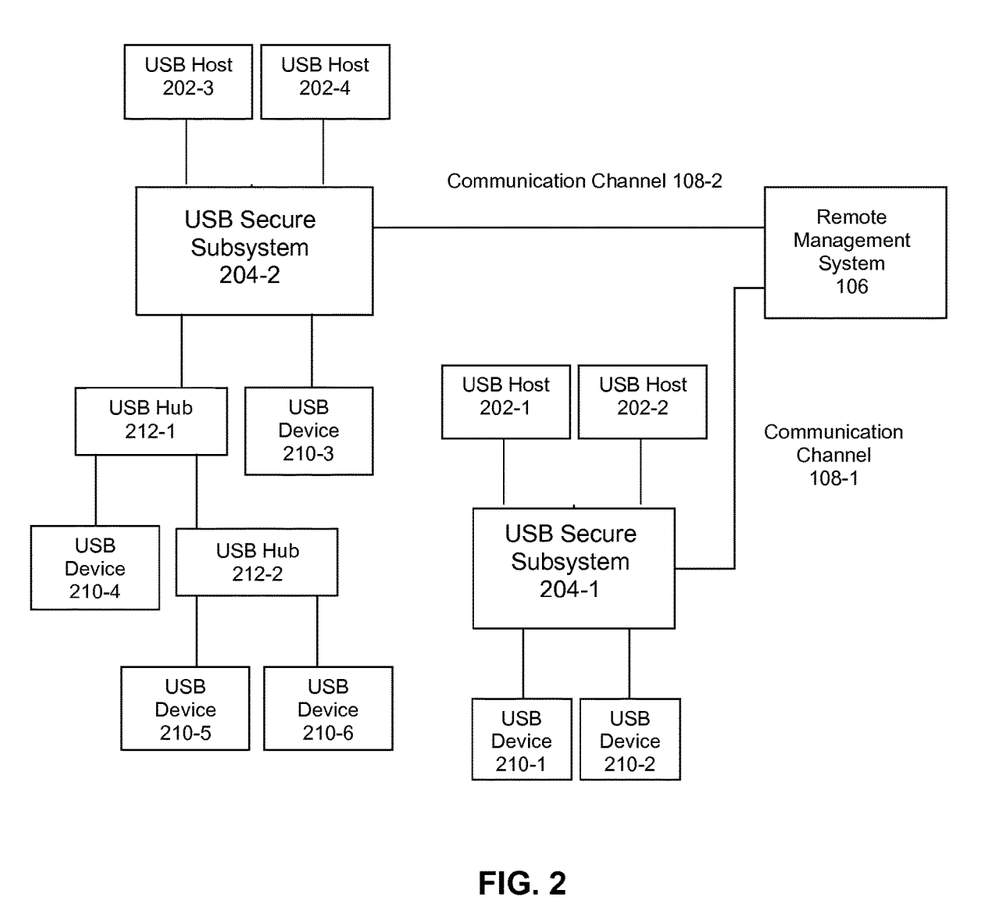
FIG. 2 is a block diagram illustrating another example system for securing USB I/O communications according to embodiments of the invention.

FIG. 2 is a block diagram illustrating another example management system 200 according to embodiments of the invention. In this example, the system manages security of computer communications and the example type of traffic is USB. As shown in this example, the system includes two USB secure subsystems 204-1 and 204-2 connected to Remote Management System 106 via respective communication channels 108-1 and 108-2.

As is known, USB allows a more complex topology, and this diagram illustrates how the invention can be applied to this and other types of I/O with such topologies. For example, as shown in FIG. 2, remote management system 106 manages secure USB communications for four USB Hosts 202-1, 202-2, 202-3 and 202-4, two USB Hubs 212-1 and 212-2, and six USB devices 210-1 to 210-6 connected either directly to the Secure USB Subsystems 204-1 and 204-2 or via USB Hubs 212-1 and 212-2. As described above, USB Host 202-1 or 202-2 can be included in a variety of computing devices including, but not limited to a server, a PC, or an embedded device such as secure computer 120.

Example aspects of securing I/O communications such as USB in a computer system that can be adapted for use in the present invention are described in more detail in co-pending application Ser. No. 13/971,582.

Figure 3:
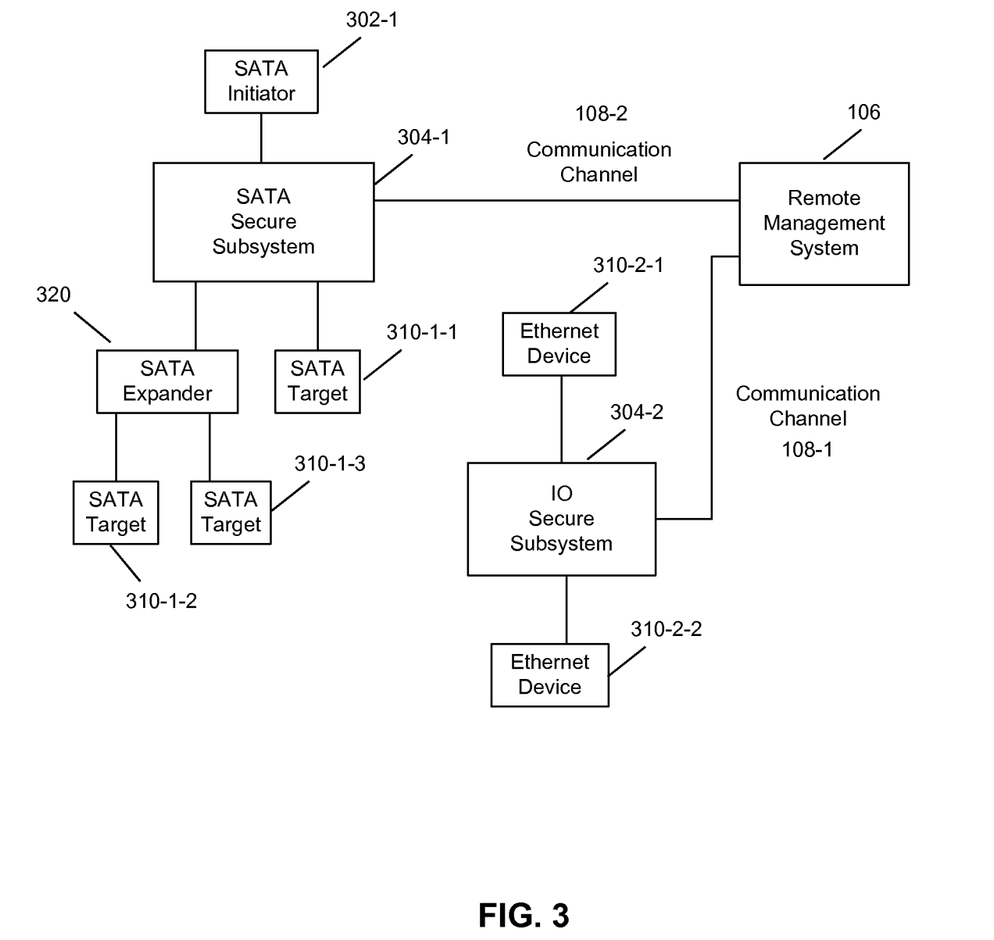
FIG. 3 is a block diagram illustrating another example system for securing SATA and/or Ethernet I/O communications according to embodiments of the invention.

FIG. 3 is a top-level block diagram of another example management system 300. It shows two different IO types being managed—SATA and Ethernet, respectively connected to Secure I/O Subsystems 304-1 and 304-2. The Two IO Secure Subsystems are connected to Remote Management System 106 via connections 108-1 and 108-2.

As shown, SATA secure subsystem 304-1 has upstream port(s) coupled to SATA initiator 302-1 and downstream ports coupled to SATA target 310-1-1 and SATA expander 320. SATA expander 320 is further coupled to SATA targets 310-1-2 and 31-1-3. Example aspects of a SATA secure subsystem that can be adapted for use in the present invention are described in co-pending application Ser. No. 13/971,732, the contents of which are incorporated herein by reference in their entirety.

Secure I/O subsystem 304-2 is coupled between two Ethernet devices 310-2-1 and 310-2. In embodiments, subsystem 304-2 includes a secure CPU network inputs, Rx Packet Parsers, Packet Processors with associated Classification and Rules Tables, Packet Editors, a Security Engine, a Tx Packet Switch and network outputs. Incoming traffic is analyzed based on rules set by the secure CPU in the classification engines and then forwarded to the appropriate network output. It may also pass through the Security Engine thereafter for further processing (e.g. decrypting/encrypting and/or hashing). This enables the secure CPU to transparently track/snoop/enable/disable/etc. . . . network packets, network flows (e.g. TCP, UDP, IPSec, SSL, etc. . . . connections) and perform deep packet inspection to further analyze the content of the network traffic (e.g. to identify which web sites are being connected to, to try to identify malware, etc.).

In embodiments, secure subsystems 304-1 and 304-2 are included in different secure computers 120-1 and 120-2, in local or remote locations from each other. In other embodiments, the secure subsystems 304-1 and 304-2 are in a common secure computer 120. In such embodiments, connections 108-1 and 108-2 can be a shared connection, while subsystems 304-1 and 304-2 are implemented separately.

Figure 4:
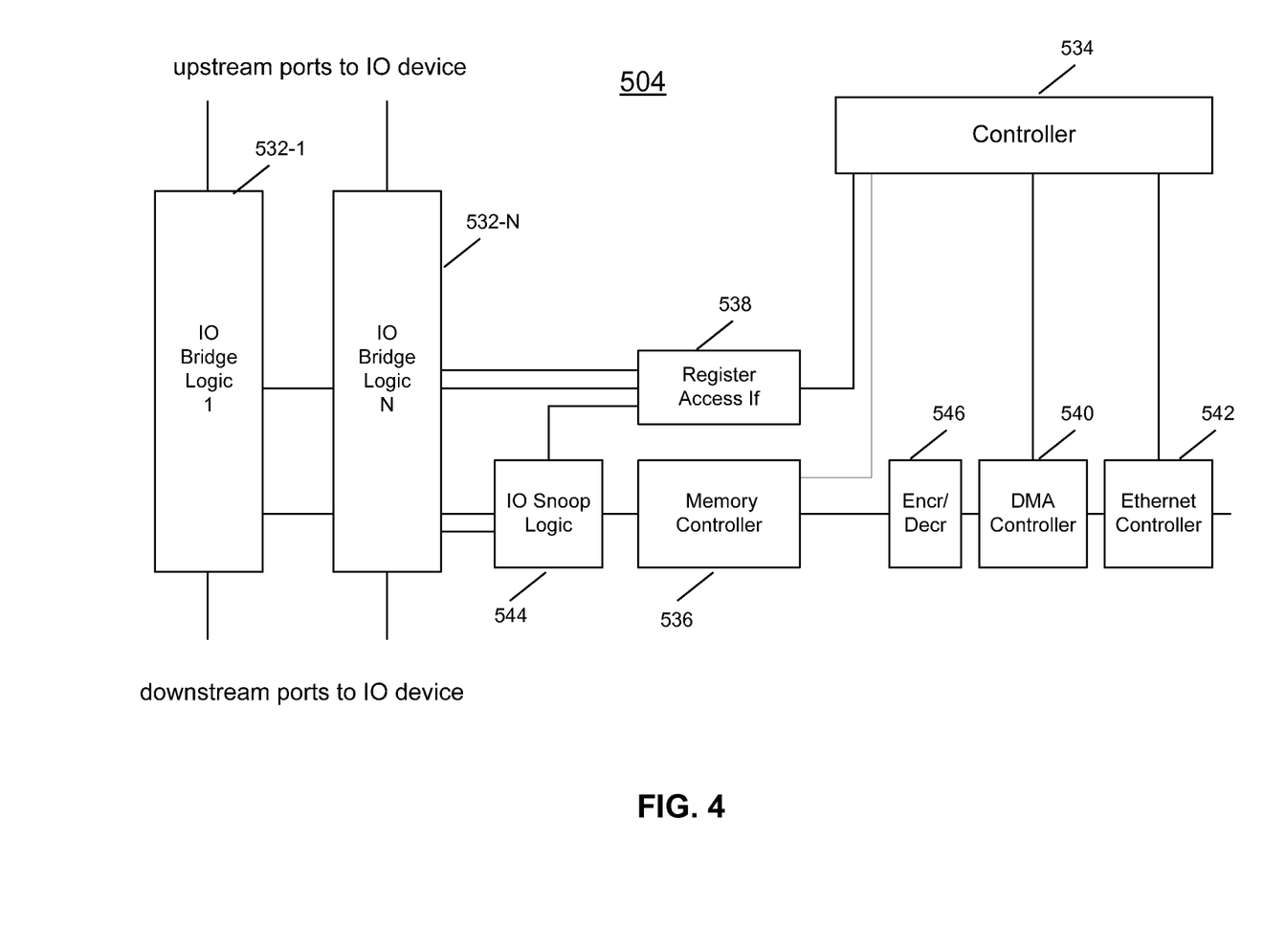
FIG. 4 is a more detailed block diagram illustrating an example subsystem that can be included in the systems shown in FIGS. 1, 2 and 3 according to embodiments of the invention.

FIG. 4 is a block diagram of an example secure subsystem 504 that can implement certain or all of the traffic snooping/capturing functionality of subsystems 104, 204, 304 and 404 according to embodiments of the present invention.

As shown in FIG. 4, example subsystem 504 consists of one to N instances of the I/O Bridge Logic 532, a controller 534, memory controller 536 for storing captured I/O traffic, register access interface 538 for providing access to registers of I/O Bridge(s) 532 and I/O Snoop Logic 544 by the Controller 534, DMA controller 540 for facilitating data transfer between memory controller 536 and remote management system 106, Ethernet controller 542, I/O snoop logic 544 (described in more detail below) and compression/encryption/decryption block 546.

Each instance of logic 532-1 to 532-N is connected between one or more I/O devices (e.g. USB hub/device, Ethernet peer, SAS/SATA target, etc.) and a corresponding I/O host (e.g. USB host, Ethernet peer, SAS/SATA initiator, etc.). In embodiments, a single subsystem 504 includes logic 532 for only a single particular type of interface (e.g. USB). In other embodiments, a single subsystem 504 includes logic 502 for a plurality of different types of interfaces.

In embodiments, bridge logic 532 is responsible for providing access to traffic between I/O devices according to configuration policies. For example, when an administrator wishes to cause certain types of USB communications to be snooped (e.g. communications with all attached USB thumb drives), remote management system 106 configures its policies appropriately and communicates the configuration to subsystem 104. Thereafter, whenever the particular device is attached (e.g. when a USB thumb drive is plugged into a USB port), this is detected by the associated bridge logic 532-1 to 532-N. Controller 534 and logic 532 cooperate to configure the channel for snooping. For all subsequent communications between the USB device and host, USB packet contents are provided to snoop logic 544, transparently to both the USB device and host.

The embodiment of FIG. 4 depicts blocks that are common to different types of I/O channels such as USB, Ethernet, SAS, and SATA. One implementation of the example subsystem 504 shown in FIG. 4 for securing USB communications (e.g. gatekeeping) is further described in co-pending U.S. application Ser. No. 13/971,582, and those skilled in the art will be able to implement the additional functionality of the present invention after being taught by the present invention. Those skilled in the art will further understand how to adapt the secure USB subsystem described in those applications for other types of communications and configurations for use with the management system 106 of the present invention after being taught by the present disclosure.

In embodiments, controller 534 can be implemented as CPU running embedded software. In other embodiments, controller 534 can be implemented entirely in hardware. In this example embodiment, Ethernet controller 542 is used to handle communications of data with remote management system. Other types of communications are possible.

Embedded software running on controller 534 can compress and encrypt the data that is sent to remote management system 106. Alternatively, those functionalities can be offloaded to a separate module 546 implemented in hardware to improve performance as shown in the example of FIG. 4.

More particularly, encryption/decryption/compression block 546 can be optionally included to perform transparent encryption and decryption of data that is sent to and received from, respectively, downstream devices. Example aspects of an encryption/decryption block 546 that can be optionally practiced with and adapted for use in the present invention are described in co-pending application Ser. No. 13/971,632, the contents of which are incorporated herein by reference in their entirety. Block 546 can further perform compression of data, for example compressing captured data before it is sent to system 106.

Figure 5:
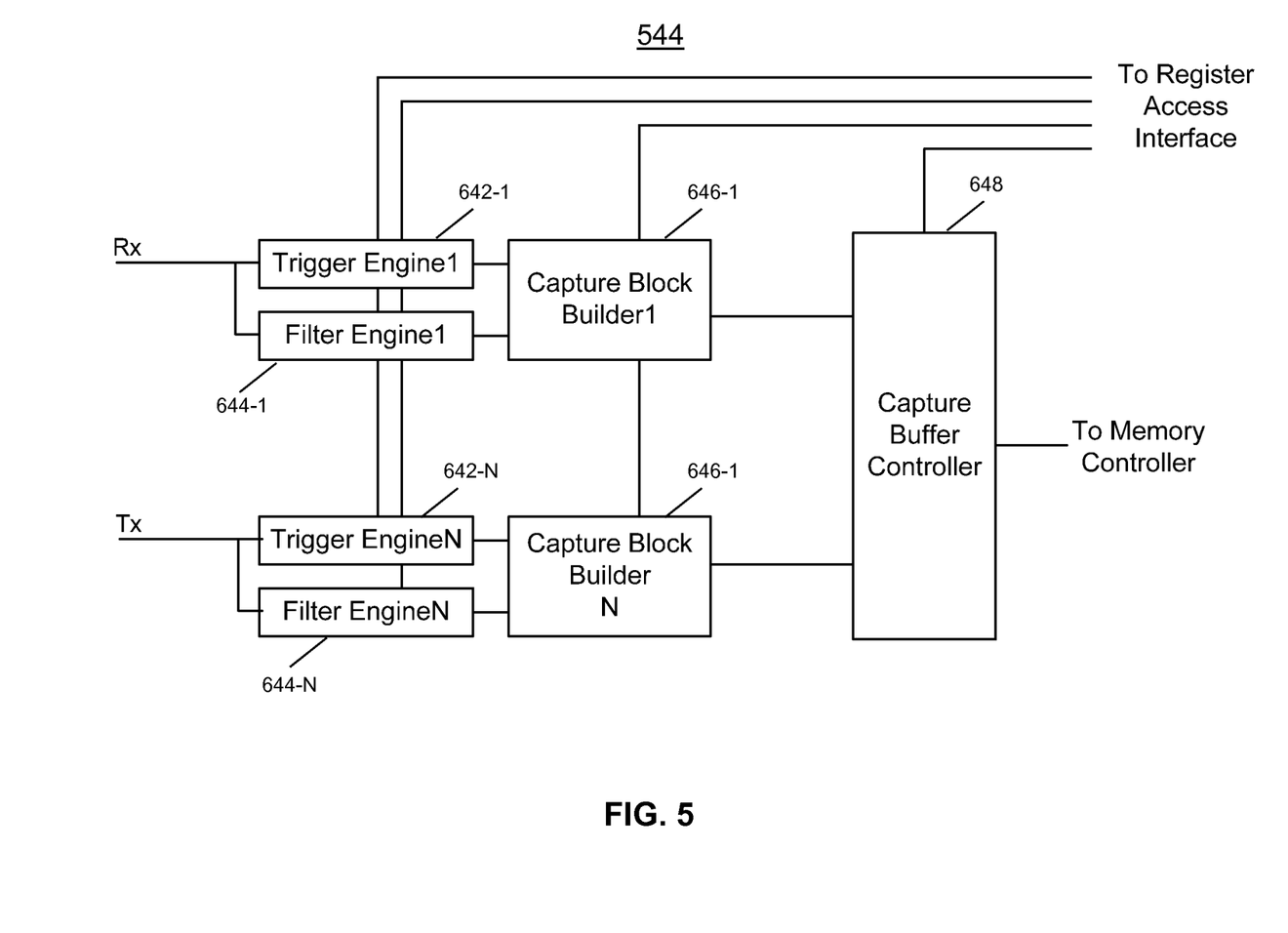
FIG. 5 is a block diagram illustrating an example configuration of snoop logic that can be included in a subsystem such as that shown in FIG. 4.

FIG. 5 is a block diagram of an example implementation of snoop logic 544 according to embodiments of the present invention. As shown in FIG. 5, example I/O snoop logic 544 includes one instance of trigger engine 642, filter engine 644 and capture block builder 646 for each associated bridge logic 532 1 to N, and Capture Buffer Controller 648. It should be noted that in embodiments such as that shown in FIG. 5, each I/O channel (e.g. N channels shown in FIG. 4) consists of both Rx and Tx paths. So the N channels in FIG. 4 would have 2 N trigger and filter engines such as those shown in FIG. 5. In other words, the quantities N in FIGS. 4 and 5 are different.

The purpose of Filter Engine 644 is to perform deep filtering of the captured IO traffic. The importance of deep filtering is illustrated in the following example. Assume there are two USB 3.0 channels being monitored by subsystem 102. Each channel is bidirectional and capable of sending 400 MByte/sec of useful payload. Further assume that subsystem 104 is connected to remote management system 106 over an Ethernet connection with available bandwidth of 10 MByte/sec. Still further assume that remote management system 106 is capable of storing and analyzing the data at the Ethernet speed.

Therefore, a worst case filtering ratio of the USB traffic should be:

$$10/400*2*2=0.625\%$$

This ratio is realistic because a system may have components with those typical rates. In general, available network bandwidth is typically smaller than client I/O bandwidth. For example, USB 3.0 (an example I/O associated with logic 532) is 5 Gbps whereas Ethernet (an example network connection for channel 108) is 1 Gbps. In reality, moreover, a network connection may only be on the order of tens of Mbps (for a WAN connection) or a few hundred Mbps in a LAN.

In embodiments, filter engine 644 accomplishes this ratio by not processing certain packet types, such as control packets and/or some or all of the contents of packet payloads. Another factor that can further complicate certain systems is the fact that available network bandwidth is constantly changing because it's shared among multiple connections. Accordingly, in embodiments, filter engine 644 constantly monitors packet queue size associated with channel 108, determines changing conditions, and adjusts the ratio accordingly.

Triggering is another mechanism to further reduce the amount of traffic sent to the remote management system 106. In embodiments, triggering engine 642 and filtering engine 644 work in tandem to reduce the amount of I/O traffic that is processed, for example in accordance with constantly changing available Ethernet or other bandwidth between subsystem 104 and system 106. For example, filtering reduces traffic based on "steady-state" criteria; i.e., reducing the overall traffic rate from x to y based on various filtering conditions. As stated, the filtering criteria can also change in order to ensure a max rate y is not exceeded. Triggering is a way to capture data only when a specific event occurs (i.e. a suspect IP address is contacted). In such a case, it is desirable to collect as much information about that event as possible. Accordingly, both filtering and triggering can work together. Traffic can be filtered but not passed on until a given Trigger occurs, or filtered traffic can always be forward to the remote management system 106 but if an event triggers then the snooped traffic is no longer filtered, or filtered differently.

Trigger engine 642 also enables security threats to be detected in real time so that communications involving an insecure device can be blocked. This is achieved by both simple packet triggering (field-based pattern matching) and a more complex transaction-level triggering. In such a case, according to embodiments of the invention, after a trigger event is detected, data is captured and sent to remote management system 106. If system 106 determines that the data involves a security threat, system 106 can instruct the secure subsystem 104 to completely block the associated device 110.

Both filtering engine 644 and triggering engine 642 can be configured by remote management system 106 and/or controller 534 based on security policies and the device(s) attached to the corresponding bridge logic 532.

Capture Block Builder (CBB) 646 receives filtered I/O data from filter engines 644 and matching I/O data from trigger engines 642. CBB 646 encapsulates the data in a format suitable for software post-processing and analysis (data blocks). For example, CBB 646 can add timestamp and other metadata to be able to correlate IO traffic from different channels. Capture Buffer Controller 648 aggregates data blocks from multiple CBB 646 modules and commits them into memory via memory controller 536.

In the example embodiment shown in FIG. 4, controller 534 can then read the data blocks and send them to remote management system 106 over an Ethernet connection.

Figure 6:
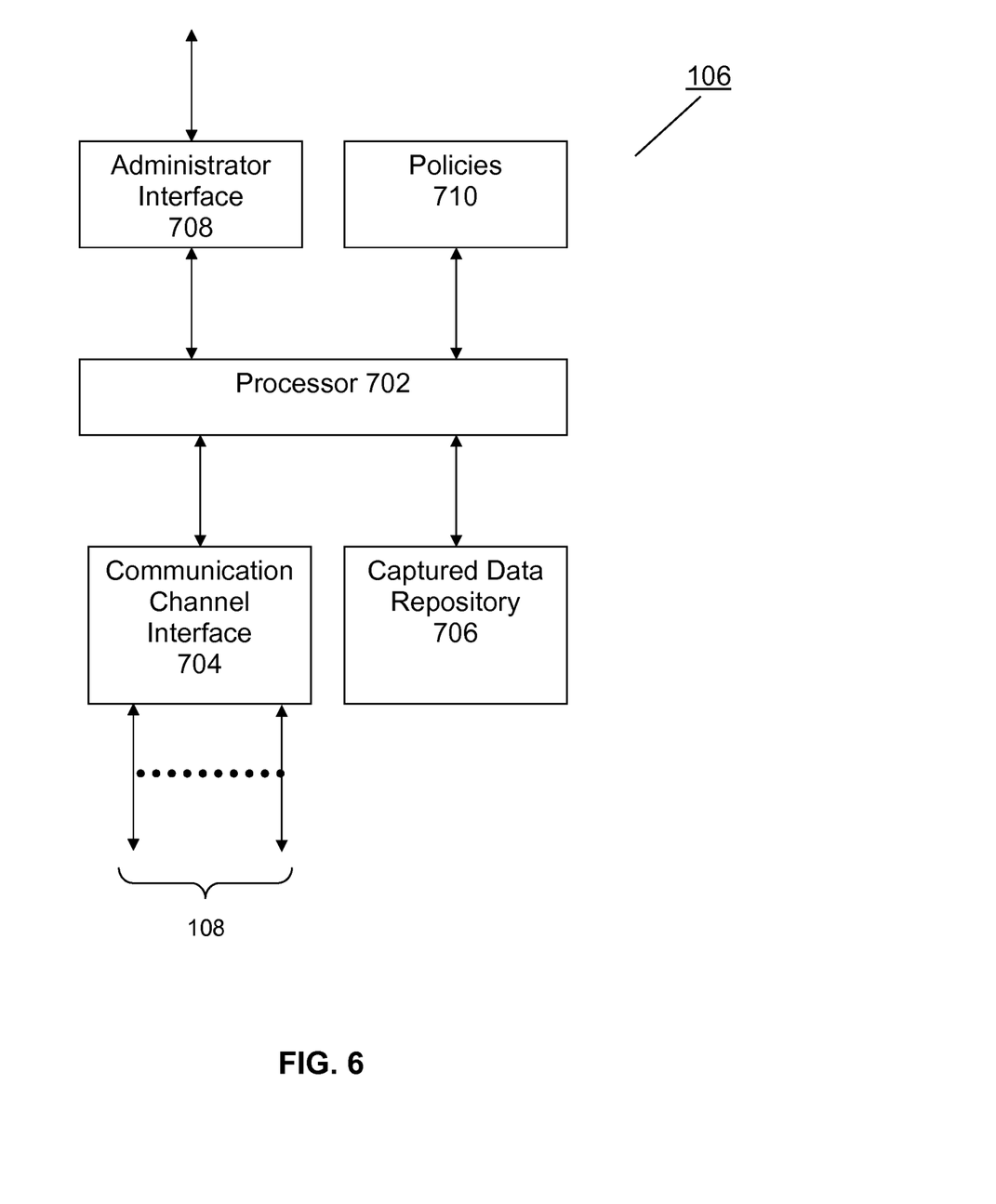
FIG. 6 is a block diagram illustrating an example remote management system that can be included in the systems shown in FIGS. 1, 2 and 3 according to embodiments of the invention.

FIG. 6 is a block diagram illustrating an example implementation of a Remote Management System 106 according to embodiments of the invention. In the example of FIG. 6, Remote Management System 106 includes a Processor 702, a Communication Channel Interface 704, a Captured Data Repository 706, and Administrator Interface 708 and Policies 710.

Processor 702 can include any suitable type of CPU or processor (e.g. x86, etc.) executing any suitable type of operating system (e.g. Unix, Linux, Windows, etc.) and/or application software. Such application software can implement and/or include functionality to manage elements 704, 706, 708 and 710, as will become more apparent to those skilled in the art after being taught by the present disclosure.

Communication channel interface 704 is responsible for exchanging messages and/or data between system 106 and subsystem(s) 104 via communication channel(s) 108. The implementation details of interface 704 can depend on the type of communications used on channel 108. In one possible implementation, communication channel interface 704 includes an Ethernet interface.

Captured data repository 706 includes data captured by security subsystems 104 and communicated to system 106 via channels 108 and interface 704. In embodiments, repository 706 comprises a database-like structure that facilitates fast (near real-time) search for interesting events such as security threat signatures. Moreover, processor 702 can perform rapid and basic analysis on selected incoming data from interface 704. The analysis algorithms can include pattern matching, network flow analysis, etc. A more thorough forensic analysis of data in repository 706 can be performed at slower speed, perhaps in the background, and perhaps using many servers to analyze and cross-correlate data from multiple secure computers 102. These algorithms can be very complex and are typically proprietary (for example "big-data" analysis). Background tagging and indexing of database 706 can be optionally implemented.

Administrator interface 708 provides an interactive user interface that allows an administrator to configure policies 710 and/or receive alerts regarding communications with managed I/O devices.

Policies 710 define operational aspects of how devices associated with subsystem(s) 104 are configured, including policies for secure communications. The number and type of policies 710 managed by system 106 depend on the number and types of device configurations and communication security functions that are desired for a particular implementation of secure system 100. These can include any number and combination of configurations and security functions described in co-pending applications Ser. Nos. 13/971,582, 13/971,711, 13/971,632, 13/971,732, 13/971,651, and 13/971,692. Those skilled in the art will be able to implement policies 710 for any such number of configurations and security functions after being taught by the present disclosure and the co-pending applications.

In connection with the traffic snooping/capturing functionalities of the present invention, policies 710 can include a list of types of devices from which to capture data and/or pre-defined keywords to detect. Additionally and relatedly, policies 710 can include situations when an alert is generated. For example, an alert may be issued when certain Ethernet packet header information is detected, if certain online addresses are accessed, if certain types of files (e.g. known malware) are communicated, etc.

Additional aspects of policies 710 and how they are managed and used according to embodiments of the invention will become more apparent from co-pending application Ser. No. 13/971,711.

Figure 7:
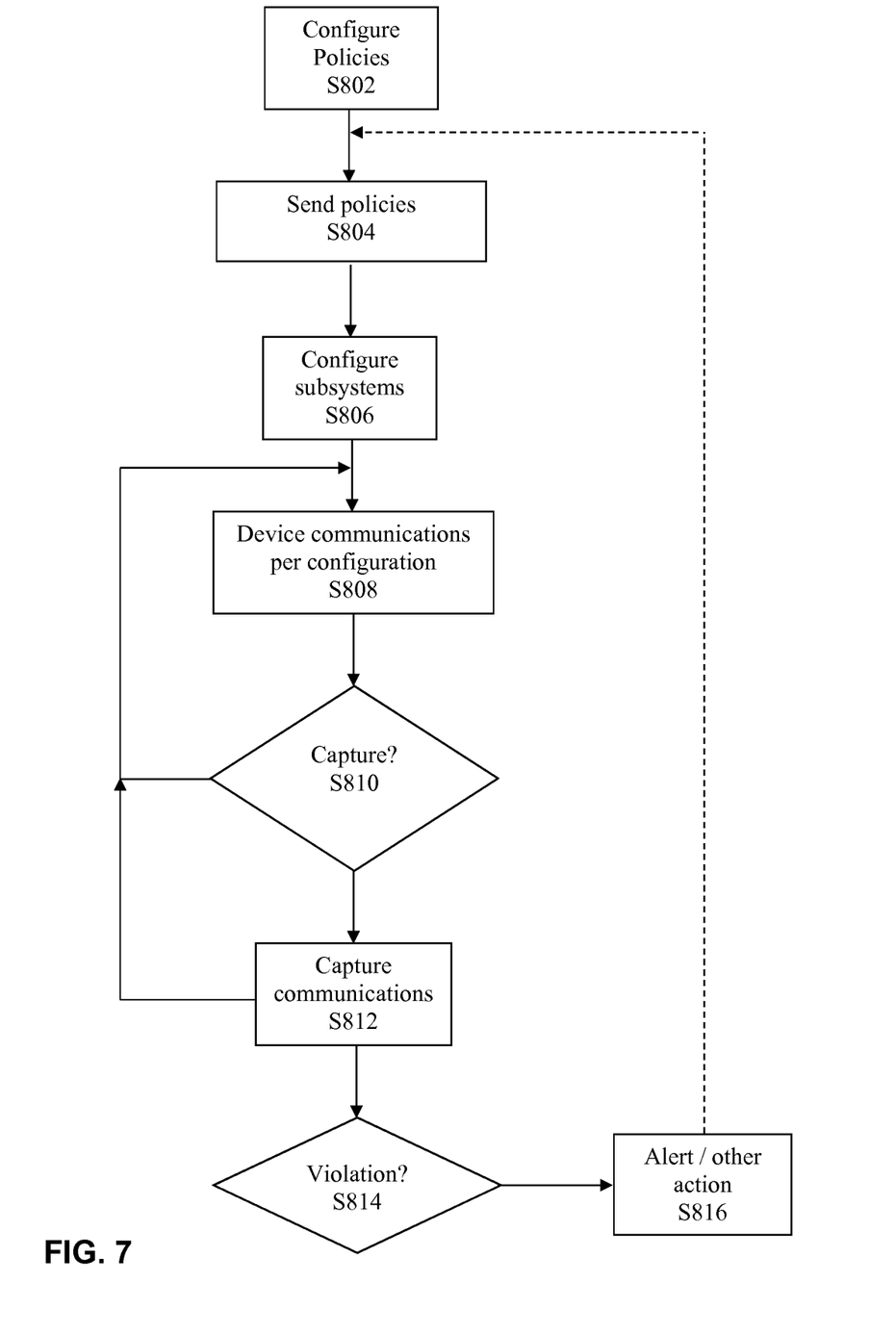
FIG. 7 is a flowchart illustrating an example methodology for snooping, capturing and/or analyzing I/O communications according to embodiments of the invention.

FIG. 7 is a flowchart illustrating an example methodology performed by subsystem 104 and management system 106 for managing security of I/O channels according to embodiments of the invention.

In step S802, policies 710 are configured. This can include adding new policies, deleting policies, and changing policies. In embodiments, such additions, deletions and changes are performed by an administrator interacting with a user interface that presents fields for different types of I/O channels and different security options. In other embodiments, policies are downloaded from an external source as scripts or configuration files.

Policies can be any variation between broad and specific. For example, policies can be configured that apply to an entire I/O type, to a device class, to a device vendor, to a specific product ID, unique device serial numbers, etc. Policies can also be dependent on a specific secure computer 120, a given user, or the attached devices of a given secure computer 120 and/or its user In general, policies dictate every operational aspect of the secure computer 120 and its associated complexes; their configuration, how and when they should operate, if and how they should snoop, what they should report as status, etc. As further set forth previously, policies can include any of a variety of actions to be taken such as limiting the devices that are allowed to be connected to the host (e.g. gatekeeping by device class), performing encryption, snooping, etc. Accordingly, the complexity and variety of actions in step S802 can depend on the configuration and security options available in the policies for any given application.

In step S804, the configured policies are sent to secure computers 120. In embodiments such as that shown in FIG. 7, policies are sent to computers 120 and in step S806 subsystems 104 are responsible for implementing the policies, such as configuring trigger/filter engines when snooping is required for a particular type of I/O or attached device. In other embodiments, policies are maintained only by the system 106, and system 106 communicates policies to secure subsystems only on an as-needed basis, such as when a new I/O device is connected to a system managed by a secure subsystem, or when a host device (e.g. PC) associated with a secure subsystem "boots" (i.e., wakes up). In these and other embodiments, there can be a set of default policies per computer 120 (or group of computers 120) and/or per user that are locally pre-stored in computers 120 and accessed by subsystems 104 whenever the computers are powered on. These policies can then be modified/updated dynamically by system 106 (automatically) or by the system administrator (manually) via the system 106 and downloaded when needed.

It should be apparent that other security actions can be taken when a device managed by the system boots or seeks network access. For example, the system can interact with secure computers 120 to first establish a VPN connection with the remote management system 106 and only thereafter access an overall network.

In step S808, as computer 120 is operating, any communications with devices configured for snooping are sent by logic 532 to the snoop logic 544. In step S810, snoop logic 532 determines if and what data is to be captured. These determinations can be made by the trigger and filter engines 642 and 644 as described above. In embodiments, there can also be a non-event type of data snooping. For example, all user mouse and keyboard input data can be configured to be sent to the remote management system 106. As another example, all user log-in/off information and/or all device attachment information can be sent to system 106.

In step S812, if data is to be captured, snoop logic 544 collects the (optionally filtered) data and subsystem 104 sends it to remote management 106, perhaps after further compression. Otherwise, processing returns to step S810 to determine if any data needs to be captured.

In step S814, system 106 can analyze the captured information (in real time or in a background mode) to determine whether any alert condition exists. If so, the alert is handled in step S816. An alert can be generated, for example, when a device has been configured for traffic snooping and a violation of a policy has been detected. As described above, a violation can be the occurrence of any number or combination of pre-defined keywords in snooped traffic. Other types of alerts can be generated automatically such as periodic status notifications from secure subsystems (e.g. heartbeat).

In embodiments, the handling of an alert can include generating an audible and/or visual signal for an administrator. The alert can also include an email message, a text message, a voice call, a desktop alert, etc. Handling an alert can also include updating a policy, applying a new or changed policy to an affected device, directly accessing the managed device, etc. In such a case, processing may return to step S804 where updated policies are sent back to the affected computer 120.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer system, comprising:
a network interface for sending and receiving data over a network;
a host computer processor that executes an operating system and applications that generate and utilize the data sent and received over the network; and
a secure subsystem interposed between the host computer processor and the network interface for capturing certain of the data sent and received via the network interface, wherein the secure subsystem includes:
snoop logic that selects for capturing into a buffer a local copy of only the certain data, the local copy being a duplicate subset of the data that is also sent and received over the network and less than all of the data sent and received over the network via the network interface, wherein a ratio between the local copy of the data that has been captured into the buffer based on the selecting and all of the data that is sent and received via the network interface is controlled by the snoop logic in accordance with at least a bandwidth of the network interface, and
a controller that configures how the snoop logic selects for capturing only the certain data by the controller accessing registers in the snoop logic via a register interface,
wherein the data sent and received over the network comprises network packets, and wherein the snoop logic forms the local copy of the certain data by one or both of:
stripping out all contents except payloads of the network packets, or
performing deep packet inspection on payloads of the network packets.

2. A computer system according to claim 1, wherein the network interface comprises one of Firewire (IEEE 1394) and Ethernet.

3. A computer system according to claim 1, wherein the secure subsystem further includes:
a bridge logic module in a communication path between the network interface and the host computer processor that provides the sent and received data to the snoop logic.

4. A computer system according to claim 1, wherein the snoop logic includes a trigger engine that identifies the certain data based on an event associated with the sent and received data.

5. A computer system according to claim 1, wherein the snoop logic includes a filter engine that identifies the certain data by filtering out certain of the sent and received data.

6. A computer system according to claim 4, wherein the controller configures how the trigger engine identifies the certain data.

7. A computer system according to claim 5, wherein the controller configures how the filter engine identifies the certain data.

8. A computer system according to claim 1, wherein the secure subsystem includes a remote management network interface for sending the certain data from the buffer to a remote management system.

9. A computer system according to claim 8, further comprising a compression block for compressing the certain data before sending to the remote management system.

10. A computer system according to claim 1, wherein the secure subsystem includes a memory controller for storing the certain data.

11. A computer system according to claim 10, further comprising a compression block for compressing the certain data before storing.

12. A computer system according to claim 1, wherein the secure subsystem further includes a capture block builder for encapsulating the local copy of the certain data into data blocks for storing in the buffer.

13. A computer system according to claim 12, wherein the capture block builder includes timestamps in the data blocks.

14. A method, comprising:
sending and receiving data over a network via a network interface;
generating and utilizing the data sent and received over the network by an operating system and applications executing on a host processor;
capturing into a buffer, by snoop logic that is interposed between the network interface and the host processor, a local copy of certain of the data, the local copy being a duplicate subset of the data that is also sent and received over the network, wherein capturing includes the snoop logic selecting only the certain data that is a subset of the data that is sent and received over the network and is less than all of the data sent and received over the network via the interface, and wherein a ratio between the local copy of the data that has been captured into the buffer based on the selecting and all of the data that is sent and received over the network via the network interface is controlled by the snoop logic in accordance with at least a bandwidth of the network interface; and
configuring, by a controller, the snoop logic for configuring how the certain data is captured by the snoop logic, wherein the controller performs the configuring by accessing registers in the snoop logic via a register interface,
wherein the data sent and received over the network comprises network packets, and wherein the snoop logic forms the local copy of the certain data by one or both of:
stripping out all contents except payloads of the network packets, or
performing deep packet inspection on payloads of the network packets.

15. A method according to claim 14, wherein the network interface comprises one of Firewire (IEEE 1394) and Ethernet.

16. A method according to claim 14, wherein capturing includes:
analyzing the sent and received data according to a configuration; and
identifying the certain data based on the analyzing.

17. A method according to claim 16, wherein identifying is performed based on an event associated with the sent and received data.

18. A method according to claim 16, wherein identifying is performed by filtering out certain of the sent and received data.

19. A method according to claim 16, further comprising obtaining the configuration from a remote management system via a network.

20. A method according to claim 14, further comprising sending the certain data to a remote management system via a network.

21. A method according to claim 20, further comprising compressing the certain data before sending to the remote management system.

22. A method according to claim 14, further comprising storing the certain data.

23. A method according to claim 22, further comprising compressing the certain data before storing.

24. A method according to claim 20, further comprising analyzing the certain data at the remote management system.

25. A method according to claim 24, wherein analyzing includes cross-correlating the certain data with data obtained from a plurality of different computer systems.

26. A method according to claim 24, further comprising taking remedial action based on the analysis, the remedial action including one or more of notifying an administrator, modifying a security policy for one or more computer systems, and disabling one or more devices associated with interfaces of the host processor.

* * * * *